July 24, 1951  L. T. SZADY  2,561,600
ROTARY ONE-WAY CLUTCH
Filed March 28, 1949
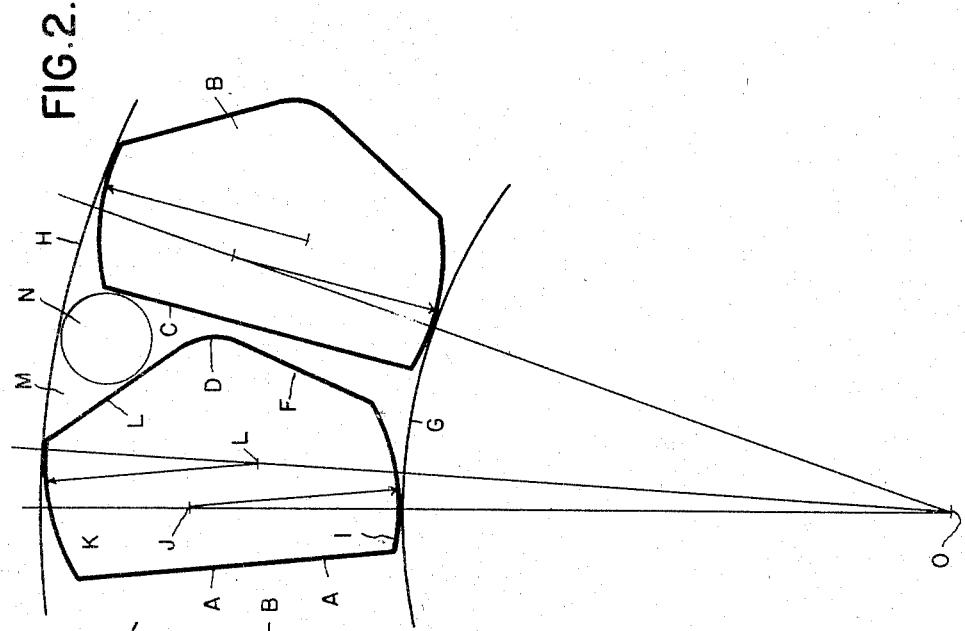
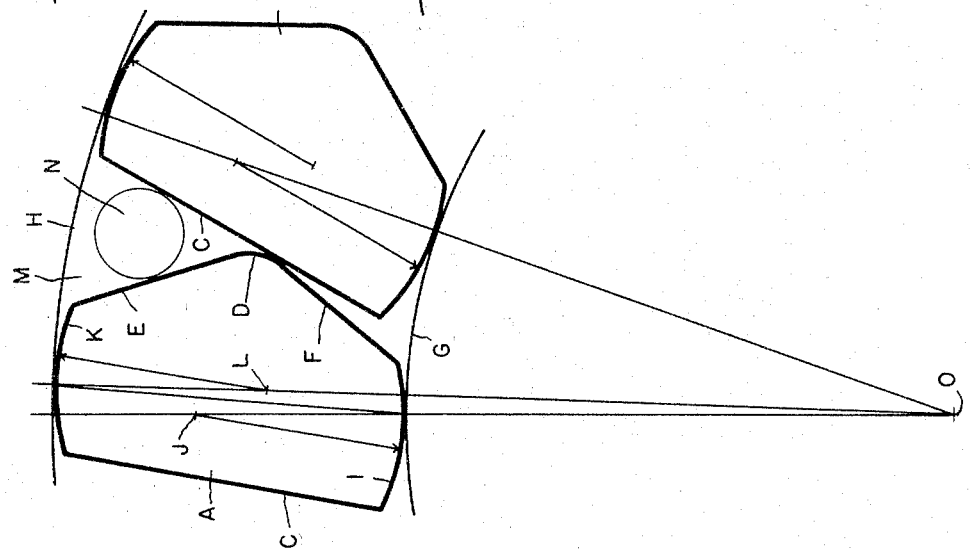
INVENTOR.
LEOPOLD T. SZADY
BY
Whittemore Hulbert & Belknap
ATTORNEYS Patented July 24, 1951

2,561,600

UNITED STATES PATENT OFFICE 2,561,600

ROTARY ONE-WAY CLUTCH

Leopold T. Szady, Detroit, Mich., assignor to Formsprag Company, Ferndale, Mich., a corporation of Michigan Application March 28, 1949, Serial No. 83,976

7 Claims. (Cl. 192—45.1)

The invention relates to rotary one-way clutches of that type in which torque is transmitted in one direction from the driving to the driven member by a series of sprags arranged between concentric raceways on the respective members. More particularly, the invention relates to that type in which the sprags have one side thereof straight and extending in a generally radial direction, while the opposite side is substantially V-shaped with a rounded apex for contacting with the adjacent sprag and limiting movement in a clutch releasing direction. One advantage of such construction is that the same sprags may be used in clutches of different radial dimensions and which use a variable number of sprags.

The sprags are formed with eccentric arcuate end surfaces for rolling contact with the respective raceways. It is advantageous to limit the degree of eccentricity as this secures better action in the clutch but, on the other hand, it is essential to avoid any danger of complete turnover of the sprag. Such result might occur under heavy load if the degree of eccentricity was too limited due to deformation of the raceways.

It is the object of the invention to provide means for positively preventing turnover of the sprags regardless of the degree of eccentricity of the opposite end surfaces thereof. This object is attained by the construction as hereinafter set forth.

In the drawings:

Figure 1 is a diagrammatic elevation of a portion of the clutch showing two sprags and their contacting raceways in released position with respect to their contacting raceways;

Figure 2 is a similar view illustrating the action of means for preventing turnover of the sprags.

Each of the two sprags A and B has a generally radially extending side C and a V-shaped opposite side with a central rounded nose portion D and obliquely extending portions E and F on opposite sides thereof. The sprags are arranged between an inner race member G and an outer race member H, which are concentric with each other. The opposite ends of each sprag are arcuate but are eccentric. Thus the arc I contacting with the race member G has its center at J, while the arc K contacting with the race member H has its center at L. The centers J and L are spaced from each other laterally a sufficient distance to give the desired degree of eccentricity.

With the construction as thus far described, the rolling of the sprags in a counter-clockwise direction will cause gripping engagement of the clutch, while the rolling movement in a clockwise direction releases the clutch. It will be noted that due to the shape of the sprags a triangular space M is left between adjacent sprags and the outer race member. Also when the sprags roll in a counter-clockwise direction (as illustrated in Figure 2) this triangular space M is diminished in area. Making use of this feature, the degree of rotation of the sprags may be limited by placing a block N of suitable dimensions within the triangular space M. As shown, and as preferably constructed, the block N is a cylindrical roller which in the position of parts shown in Figure 1 is in contact with the sides C and E of the adjacent sprags but is spaced a considerable distance from the outer race member H. In the position of parts shown in Figure 2, the triangular space M has been so diminished in area as to bring the roller N into contact with the race member H. This will prevent any further rotation of either of the sprags, for if this were to occur the space M would necessarily be further diminished in area. However, as the roller N is formed of rigid material, such action is impossible. It will also be observed from Figure 2 that the sprags have not reached the turnover point. In other words, the centers J and L are not in alignment with each other from the center O of the clutch. The construction described adds very little to the cost of the clutch and will effectively prevent turnover of the sprags. The roller N, or other block, may be placed between adjacent sprags of one or more pairs in the series, but for heavy duty it is preferable to have them between the sprags of each pair.

What I claim as my invention is:

1. A one-way clutch comprising parallel raceways and a series of sprags therebetween contacting each other when not in clutching engagement, each fashioned to form a space between adjacent sprags and one of said raceways which diminishes in area as the contacting sprags roll toward clutch engaging position, and a block located and free within said space for limiting the contraction thereof and rolling of said sprag beyond a predetermined point.

2. A one-way clutch comprising parallel raceways and a series of sprags therebetween, one side of a sprag being obliquely inclined to form in connection with the adjacent sprag and a raceway a triangular space which diminishes in area as the sprags roll towards clutch engaging position, and a block located in said space for limiting the contraction thereof and rolling of the sprags beyond a predetermined point.

3. A one-way clutch comprising parallel raceways and a series of sprags therebetween, each sprag having one side thereof extending in a generally radial direction and the opposite side V-shaped for centrally contacting the adjacent sprag to limit the rolling thereof in clutch releasing direction and also forming a triangular space between the said adjacent sprags and the outer raceway which diminishes in area by the rolling of the sprags towards clutch engaging position, and a block located in said triangular space of dimensions to limit contraction in area and the rolling of the sprags beyond a predetermined point.

4. A one-way clutch comprising parallel raceways and a series of sprags therebetween, each sprag having one side thereof extending in a generally radial direction and the opposite side V-shaped for centrally contacting with the adjacent sprag to limit rolling thereof in clutch releasing direction and also forming a triangular space between said adjacent sprags and the outer raceway which diminishes in area as the sprags roll towards clutch engaging position, and a cylindrical roller located within said space of a diameter to limit contraction of area and rolling of said sprags to completely turn over.

5. A one-way clutch comprising parallel raceways and a series of sprags therebetween contacting each other when not in clutching engagement, each fashioned to form a space between each pair of adjacent contacting sprags and one of the raceways which diminishes in area as the sprags roll towards clutch engaging position, and a block located and free within the space of one or more pairs of sprags to limit the rolling thereof.

6. A one-way clutch comprising parallel raceways, a series of sprags therebetween, each sprag having one side thereof extending in a generally radial direction and the opposite side V-shaped for centrally contacting the adjacent sprag to limit rolling thereof in clutch releasing direction and also forming a triangular space between said adjacent sprags and the outer raceway, and a roller located in one or more of said spaces to limit the rolling of said sprags towards clutch engaging position.

7. A one-way clutch comprising parallel raceways, a series of sprags therebetween, each sprag having one side thereof extending in a generally radial direction and the opposite side V-shaped for centrally contacting with the adjacent sprag to limit rolling thereof in clutch releasing direction and also forming a triangular space between said adjacent sprags and the outer raceway which diminishes in area as the sprags roll toward clutch engaging position, and rollers located within each of the spaces for limiting the contraction of the area thereof and the rolling of said sprags.

LEOPOLD T. SZADY.

REFERENCES CITED

The following references are of record in the file of this patent:

UNITED STATES PATENTS

| Number | Name | Date |
|---|---|---|
| 2,366,842 | Dodge et al. | Jan. 9, 1945 |
| 2,486,262 | Danis | Oct. 25, 1949 |